United States Patent
Glass et al.

[15] 3,677,318
[45] July 18, 1972

[54] RADIAL TIRES

[72] Inventors: Eduard Glass, Wipperauer Str. 45, 565 Solingen-Landwehr; Heinrich Alker, Aachener Str. 26, 565 Solingen-Ohligs, both of Germany

[22] Filed: Sept. 15, 1970

[21] Appl. No.: 72,414

[52] U.S. Cl. .............................. 152/356, 152/358, 152/359
[51] Int. Cl. ........................................................ B60c 9/06
[58] Field of Search ............. 152/354, 355, 356, 357, 358, 152/359

[56] References Cited

UNITED STATES PATENTS

| | | |
|---|---|---|
| 1,641,792 | 9/1927 | Trotter .............................. 152/359 X |
| 3,486,546 | 12/1969 | Sidles et al. ......................... 152/330 |
| 3,208,500 | 9/1965 | Knipp et al. ........................ 152/327 |
| 3,540,512 | 11/1970 | Heimovics, Jr. et al. ............. 152/359 |
| 3,395,744 | 8/1968 | Wolf et al. .......................... 152/358 |

*Primary Examiner*—Arthur L. La Point
*Assistant Examiner*—Robert Saifer
*Attorney*—McNenny, Farrington, Pearne and Gordon

[57] ABSTRACT

Radial tires are provided with plies made from a fabric with warp filaments running across the carcass of the tire at right angles to the direction of rotation, and weft filaments running circumferentially of the tire, the weft filaments being made from two or more different materials whose strength and stretch properties differ so that the warp filaments are able to spread uniformly during curving of the tire blank.

6 Claims, 6 Drawing Figures

RADIAL TIRES

This invention relates to a tire for motor vehicles comprising, in the textile foundation, cord filaments extending from bead to bead at a right angle or substantially at a right angle to the direction of travel. Tires of this kind are known as radial tires.

In conventional cross-ply tires, the fabric or textile foundation (carcass) is known to consist of several layers of cord filaments which cross one another. The cord filaments in the individual layers extend at an angle to the line of maximum circumference of the tire and reach from bead to bead.

Radial tires have become more widely used in recent years. In tires of this kind, the cord filaments of the carcass are situated at a right angle or substantially at a right angle to the direction of travel. Tires of this kind show particularly good elastic properties and a reduced resistance to rolling due to the relatively stiff zone between the carcass and the tread.

A radial tire is produced in fundamentally the same way as a cross-ply tire. To ensure that the cord filaments are arranged in the required pattern in the completed carcass, however, the cords have to be placed parallel to the cylinder axis on the make-up drum of a tire-winding machine, which is usually in the form of a cylinder. If the tire blank is then curved, transverse gaps, increasing from the beads towards the maximum tire circumference, are formed between the cord filaments.

The cord filaments occupy the proper positions during curving, providing they are not held together by weft filaments. To enable the cord filaments to spread properly in this way, it is necessary to operate without any weft filaments, which means that an expensive frame has to be installed in front of the preparation machine. The use of a frame is only economical when tires of one type and size are produced in large numbers because it is to refit the frame is a time-consuming operation.

It is known that the cord filaments lying in the warp direction can be joined by relatively weak weft filaments so that a fabric is formed which forms stable bales and which is easy to handle during production. The weft filaments of this fabric are made from a material whose strength is such that they break during curving, releasing the radial cord filament for spreading. It has been found, however, that it is not possible in this way to obtain a completely uniform spreading of the radial filaments. This is because the weft filaments break at different times with the result that some of the filaments are only released after they have moved into a position differing from the required position. One particularly serious disadvantage is that, in many places, the hold of the weft filaments is not broken at all so that contractions occur in the carcase, recognizable from irregularities in its inner surface. These contractions produce considerable inbalances in the finished tire, which have to be corrected by fitting balance weights on the wheel rims after the tire has been fitted.

The use of high grade bulk-elastic yarn as weft filaments for the cord does not help in any way, because the stretchability of this material is lost during the preceding latexing operation.

If the weft of the cord fabric is made from rubber or another elastic material, deficiencies in adhesion can occur at the intersections so that considerable difficulties are involved in using a material of this kind.

Accordingly, the object of the invention is to provide a cord insert for the foundation of a vehicle tire which, when stored in the form of bales, does not "run," i.e., retains its width in all parts of the bale, and whose cord filaments have sufficient freedom of movement during curving of the tire blank to spread uniformly.

The present invention provides a radial vehicle tire having plies made from a cord fabric whose weft filaments lie circumferentially in the finished tire and comprise two or more types of filaments having different strength and stretch properties so that the warp filaments are able to spread uniformly during curving of the tire blank.

According to the invention, the plies are made from a cord fabric whose weft filaments, lying in the peripheral direction in the finished tire, are made from two or more types of filaments with different strength and stretch properties, for example a highly elastic or highly plastic material, and also a material of limited-stretchability. In this way, the cord filaments are able to spread uniformly during curving of the tire blank. Any zig-zagging of the warp filaments is reduced by the high elasticity of the weft material and by virtue of the fact that, due to this property, the weft yields to the cord filaments.

In one advantageous embodiment of the invention, the weft filaments consist of a two-component yarn with one elastic or highly plastically deformable component and one less elastic component, the less elastic component being worked into the yarn in such a way that, for a strength of 20 to 200 g/filament, it restricts the stretchability of the elastomeric or plastomeric component during processing in weft winding, weaving and during transportation and preparation as well.

The weft filaments preferably have a highly elastic or plastic core around which a fibrous material, for example fibers of cotton, viscose staple, wool, polyester, polyamide, polyacrylonitrile, polyvinyl alcohol, polypropylene, glass, metal, or asbestos, is spun with limited twist (normal twist = 1,000 turns per meter) so that the fiber component expands when the weft filament as a whole undergoes stressing during tire production and the high elastic or plastic elongation of the core filament produces uniform distribution of the cord filaments in the tire. Outstanding results are obtained, for example, when the weft filaments consist of polyurethane core filaments with cotton or rayon spun around them, or of unstretched man-made filaments, for example of nylon, polyester or polypropylene, with cotton or rayon spun around them which have a plastic elongation of more than 100 percent, although other plastics may also be used as the core material.

Other features and advantages of the invention will be apparent from the following description and from the claims.

One embodiment of the radial tire according to the invention is diagrammatically illustrated by way of example in the accompanying drawings, wherein.

Figure 1:
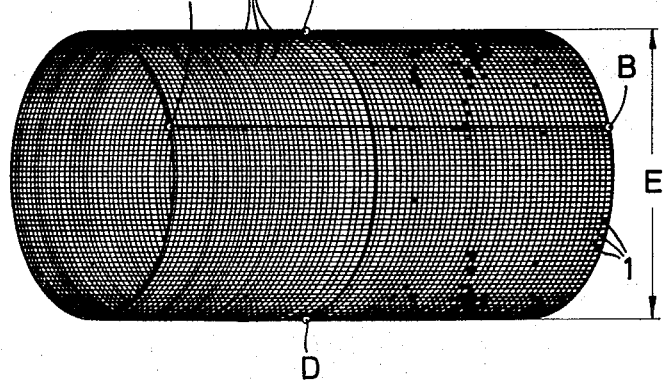
FIG. 1 shows the position of the filaments forming the cord fabric before curving.

As shown in FIG. 1, the cord fabric for the foundation of the carcass is placed on a cylindrical make-up drum in such a way that the cord filaments 1 extend at right angles or substantially at right angles to the direction of travel of the finished radial tire. In the interest of clarity, the cord filaments are shown with large gaps between them in the drawing.

The highly elastic or plastic weft filaments 2, which nevertheless are limited to a certain strength in their elongation, extend accordingly around the circumference of the make-up drum. The weft filaments 2 are preferably made of so-called core-spun yarn, i.e., a yarn which has, for example, a core filament of polyurethane, or another plastic such as unstretched nylon, and a covering of cotton. The cover is applied in such a way that for example the extensibility of the deformable core filament, which is intrinsically from 100 to 800 percent, is reduced to from 5 to 30 percent, the covering material having a strength of from 20 to 200 g. Accordingly, the fabric can be satisfactorily made up into bales which remain stable even during storage and transportation, because, for example, the cotton covering prevents the bale from "running" sideways which would otherwise occur because of the high elongation of the deformable core filament.

Figures 4, 5:
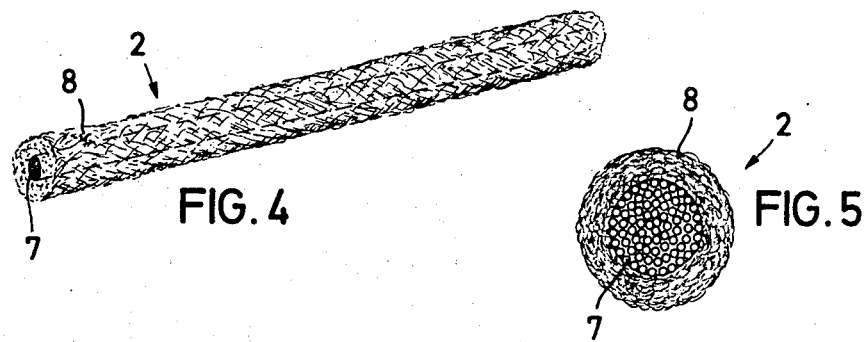
FIG. 4 is a perspective partial view of an enlarged scale of a weft filament as used according to the invention.
FIG. 5 is a cross-section through the weft filament shown in FIG. 4 on an even larger scale.
Figure 6:
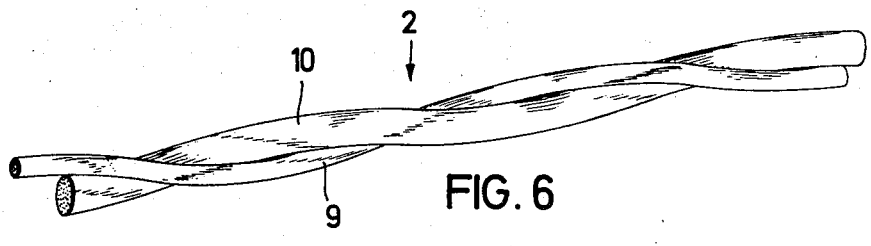
FIG. 6 is a perspective partial view of another weft filament as used according to the invention on a greatly enlarged scale.

According to FIG. 6, another possibility is to make the weft filament 2 from two filaments twisted with one another, namely a highly plastic filament 9 of a plastics material and a dimensionally stable filament 10 of cotton. The twisted filaments consist of substantially the same materials as are employed for the weft filament shown in FIGS. 4 and 5.

Figure 2:
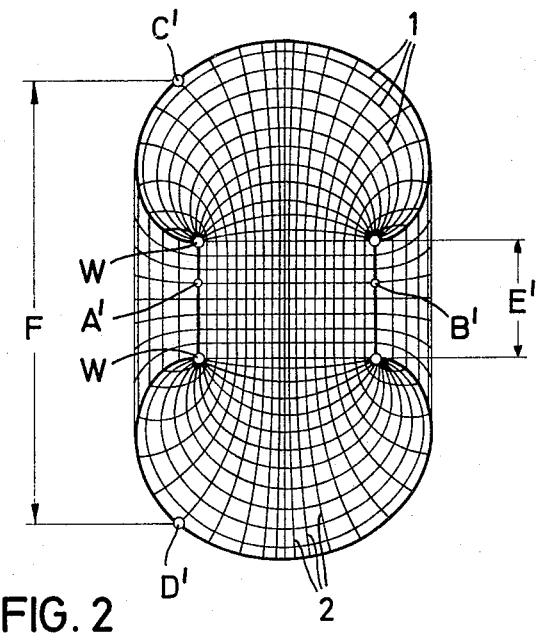
FIG. 2 shows the position of the filaments of the cord fabric after the carcass has been curved.

During curving, the carcass assumes the form shown in FIG. 2. The cylinder length AB is converted into a meridian A'B' of the tire during axial compression of the cylinder, whilst a circular line CD lying on the periphery of the cylinder becomes a parallel circle C'D' of the tire. Since the internal diameter E at the bead W of the curved tire corresponds to the diameter of the make-up drum, and since the maximum diameter F of the curved carcass is considerably greater, the transverse interval between two adjacent filaments must increase steadily towards the center from the beads W providing the cord filaments 1 are uniformly distributed. Since the weft filaments 2 extending in the circumferential direction do not offer any appreciable resistance to the spreading movement in the gaps formed during spreading of the cord filaments, the cord filaments 1 are able to move freely and hence absolutely uniformly into the position shown in FIG. 2. Accordingly, there are no contractions so that the finished tire is substantially free from imbalance phenomena of the kind which would otherwise occur during curving. The weft filaments do not break either.

Figure 3:
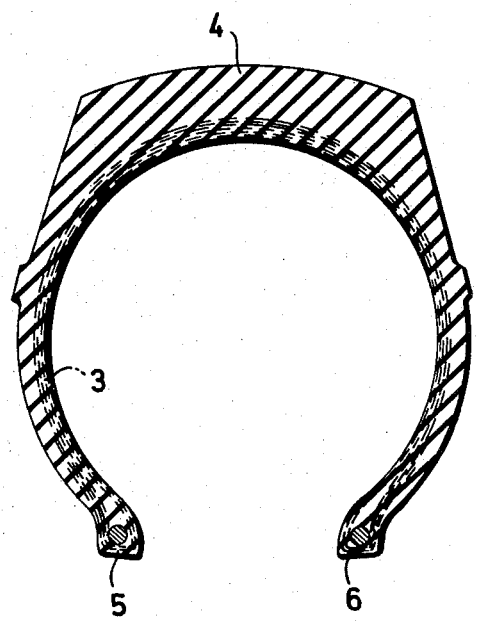
FIG. 3 is a cross-section through the finished radial tire.

FIG. 3 shows how the fabric 3 lies in the finished tire 4, extending from bead 5 to bead 6.

The plastic filament provided for the weft filaments 2 consisting of two or more components used in accordance with the invention is an intermediate product of the man-made fiber industry which at present is not commercially available. In other respects, the weft filaments 2 are of such configuration that under a certain load the covering 8 or the dimensionally stable twist filament 10, i.e., the staple fiber, "runs" so that the plastic filament 7 or 9 takes over the necessary holding function for the uniform spreading of the cord filaments (warp filaments) without any breakages in the weft filament. Multicomponent filaments of this kind have never been used in the textile industry.

We claim:

1. A radial tire for a vehicle having a tread, beads and radial plies, said plies consisting of woven textile material with warp filaments extending from bead to bead at right angles to said beads, and weft filaments at right angles to said warp filaments, said weft filaments consisting of at least two components of different stretch and strength properties, having a core selected from elastically deformable and plastically deformable materials and a relatively inextensible fibrous wrapping.

2. A radial tire according to claim 1 wherein said weft filaments consist of a highly deformable component, and a less deformable component having a strength of from about 20 to about 200 grams/filament.

3. A radial tire according to claim 1 wherein said core comprises a polyurethane filament and said fibrous wrapping consists of fibers selected from cotton fibers and rayon fibers.

4. A radial tire according to claim 1 wherein said core consists of unstretched filaments selected from nylon, polyester and polypropylene filaments and said fibrous wrapping consists of fibers selected from cotton fibers and rayon fibers.

5. A radial tire according to claim 2 wherein said highly deformable component has a breaking elongation of more than 30 percent and said less deformable component has a breaking elongation of less than 20 percent.

6. A radial tire according to claim 2 wherein said weft filaments consist of filaments of said highly deformable component twisted with said less deformable component.

* * * * *